United States Patent [19]

Hornbaker et al.

[11] Patent Number: 4,458,046
[45] Date of Patent: Jul. 3, 1984

[54] THERMOPLASTIC COMPOSITIONS OF VINYL CHLORIDE POLYMERS AND IMIDE CONTAINING POLYMERS

[75] Inventors: Edwin D. Hornbaker, Jesse D. Jones, both of Baton Rouge, La.

[73] Assignee: Ethyl Corporation, Richmond, Va.

[21] Appl. No.: 400,021

[22] Filed: Jul. 20, 1982

Related U.S. Application Data

[63] Continuation-in-part of Ser. No. 209,844, Nov. 24, 1980, abandoned.

[51] Int. Cl.³ .............................................. C08L 27/06
[52] U.S. Cl. ................................. 524/399; 524/430; 524/434; 525/71; 525/73; 525/74; 525/205; 525/207
[58] Field of Search ............... 525/71, 73, 74, 205, 525/207; 524/399, 430, 434

[56] References Cited

U.S. PATENT DOCUMENTS

| | | | |
|---|---|---|---|
| 3,639,509 | 2/1972 | Andrascheck et al. | 525/73 |
| 3,652,726 | 3/1972 | Nield et al. | 525/67 |
| 4,122,130 | 10/1978 | Fava | 525/74 |
| 4,129,614 | 12/1978 | Fava | 525/74 |
| 4,255,322 | 3/1981 | Kopchik | 525/73 |
| 4,284,735 | 8/1981 | Fava | 525/903 |
| 4,311,806 | 1/1982 | Dufour | 525/71 |
| 4,339,554 | 7/1982 | Doak | 525/73 |

FOREIGN PATENT DOCUMENTS 1293542 10/1972 United Kingdom .

Primary Examiner—Wilbert J. Briggs, Sr.
Attorney, Agent, or Firm—Donald L. Johnson; John F. Sieberth

[57] ABSTRACT

A thermoplastic composition made up of an intimate admixture of (a) a vinyl chloride polymer, and (b) a thermoplastic copolymer of vinyl aromatic compound and an imide derivative of an ethylenically unsaturated dicarboxylic acid. The preferred blends contain from 90 to 40 weight percent of (a) and 10 to 60 weight percent of (b).

31 Claims, 1 Drawing Figure

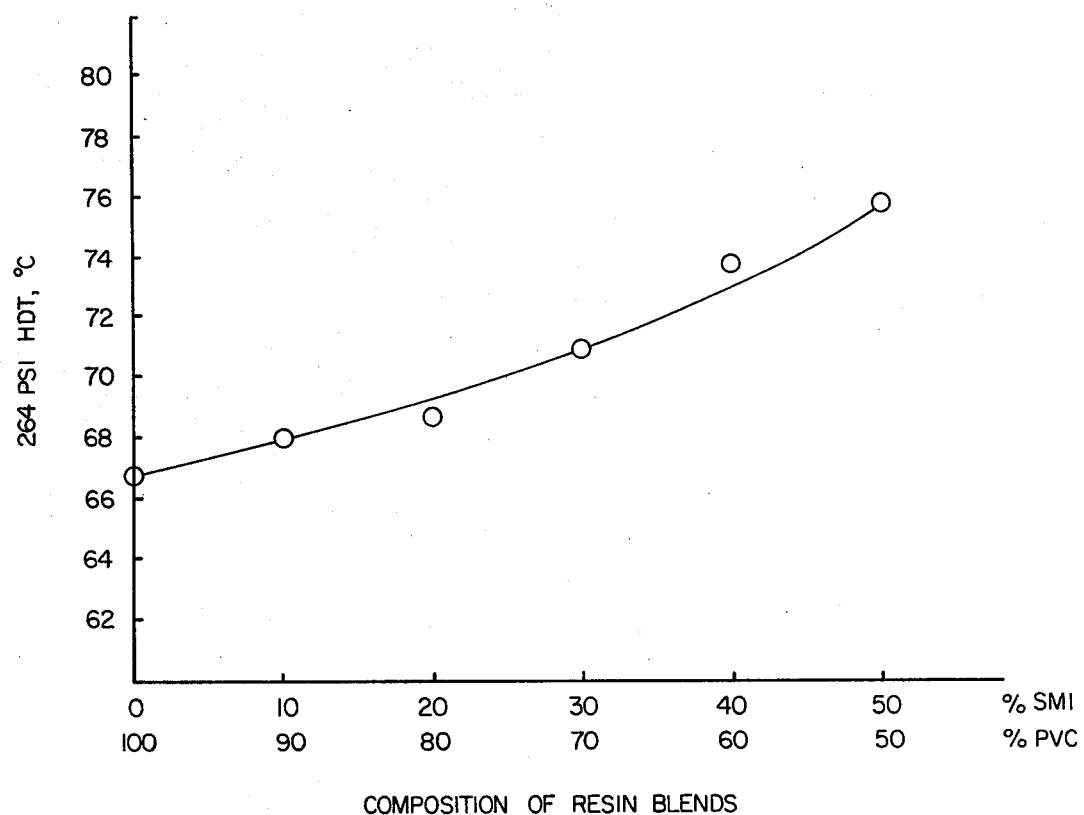
FIGURE

THERMOPLASTIC COMPOSITIONS OF VINYL CHLORIDE POLYMERS AND IMIDE CONTAINING POLYMERS

REFERENCE TO RELATED APPLICATION

This is a continuation-in-part of our prior copending application Ser. No. 209,844, filed Nov. 24, 1980 and now abandoned.

TECHNICAL FIELD

This invention relates to vinyl chloride polymer compositions of enhanced performance characteristics.

BACKGROUND

Vinyl chloride resins are widely used in the manufacture of various useful end products, including moldings, tile, pipe, sheets, film, bottles, and the like. Unfortunately, unplasticized vinyl chloride resins used in the manufacture of rigid end products tend to have poor heat deformation characteristics. Consequently, they are unsuitable for use in certain areas of application where structural integrity under heat and load is of prime importance.

THE INVENTION

It has now been discovered that blends of vinyl chloride polymers and copolymers of the styrene-maleimide type can be produced having a number of superior performance characteristics, including increased resistance to heat deformation under load, flame resistancy, and other properties desired in thermoplastic compositions for use in injecting molding, extrusion, or other processing applications. These new compositions are readily produced by known blending procedures and require no special preparatory techniques or precautions.

More particularly, this invention provides a thermoplastic composition which comprises in intimate admixture (a) a vinyl chloride polymer, and (b) a thermoplastic copolymer of a vinyl aromatic compound and an imide derivative of an ethylenically unsaturated dicarboxylic acid. The preferred compositions are those in which the blend contains from 90 to 40 (most preferably 60 to 40) weight percent of (a) and 10 to 60 (most preferably 40 to 60) weight percent of (b).

Although component (b) may be a rubber-free copolymer, a preferred embodiment of this invention involves use of a rubber-modified thermoplastic copolymer of a vinyl aromatic compound and an imide derivative of an ethylenically unsaturated dicarboxylic acid.

Hence this invention also provides a thermoplastic composition which comprises in intimate admixture (a) a vinyl chloride polymer, and (b) a rubber-modified thermoplastic graft copolymer of a vinyl aromatic compound and an imide derivative of an ethylenically unsaturated dicarboxylic acid. This blend preferably contains 90 to 25 (most preferably 60 to 35) weight percent of (a) and 10 to 75 (most preferably 40 to 65) weight percent of (b).

Component (a), the vinyl chloride resin, may be a homopolymer of vinyl chloride or a copolymer of vinyl chloride with a minor portion of one or more monomers copolymerizable with vinyl chloride. In such copolymers vinyl chloride comprises on a weight basis at least about 80 (preferably at least 90) percent of the copolymer and the copolymerizable monomer comprises up to about 20 (preferably up to about 10) percent. A wide variety of copolymerizable monomers may be used to prepare such vinyl chloride copolymers. These include vinylidene chloride; vinyl acetate and vinyl stearate; acrylic and methacrylic acid esters; olefins such as ethylene, propylene, isobutylene and the like; vinyl alkyl ethers such as vinyl isobutyl ether, vinyl lauryl ether, and vinyl cetyl ether; acrylic acid and methacrylic acid; acrylonitrile and methacrylonitrile; diethyl fumarate; maleic anhydride; dimethyl itaconate; styrene; N-vinyl carbazole; N-vinyl pyrrolidone; allyl compounds such as allyl chloride; diolefins such as butadiene, isoprene, chloroprene and the like; or mixtures thereof. Further, the vinyl chloride resins include halogenated polyvinyl chloride and the like.

Methods for the preparation of vinyl chloride polymers are well known in the art and reported in the literature. See for example Kirk-Othmer, *Encyclopedia of Chemical Technology*, Second Edition, Interscience Publishers, Volume 21, pages 369–412, (Copyright 1970), the disclosure of which is incorporated herein. Vinyl chloride polymers are available from a number of commercial suppliers. For preparing blends of this invention for use in injection molding operations, the vinyl chloride polymer should have a relative viscosity (as measured at a concentration of 1 gram per 100 grams of cyclohexanone at 25° C.) in the range of about 1.50 to about 1.85 and more preferably in the range of about 1.50 to about 1.65. Accordingly the use of such vinyl chloride resins constitutes most preferred embodiments. Polyvinyl chloride homopolymer resins falling within these relative viscosity ranges are particularly preferred. For preparing blends of this invention for extrusion purposes, it is recommended that the vinyl chloride polymer have a relative viscosity (as measured under the foregoing conditions) of about 2.00 to about 2.55. Thus use of such vinyl chloride polymers in the blends of this invention constitutes yet another preferred embodiment. It is particularly preferred to employ polyvinyl chloride homopolymer resins falling in this latter range when preparing extrusion grade blends of this invention. Blends made from vinyl chloride polymers of relative viscosities intermediate those described above—i.e., between about 1.85 and about 2.00—are useful, for example, in making sheet extrusion grades and the like.

Component (b), copolymers of a vinyl aromatic compound and an imide derivative of an ethylenically unsaturated dicarboxylic acid, are also well known in the art and are described in the literature. See for example U.S. Pat. No. 3,840,499, the disclosure of which is incorporated herein.

As pointed out in U.S. Pat. No. 3,840,499, copolymers of vinyl aryl monomers, such as styrene and the like, with imides of ethylenically unsaturated dicarboxylic acids, such as maleimide, can be prepared by direct copolymerization of the monomers. Such polymerization usually yields the 1:1 alternating copolymers although special techniques have been developed to prepare non-equimolar copolymers. The patent then describes in detail a more desirable way of forming the component (b) copolymers, viz., by directly reacting aqueous ammonia or amines at 120°–200° C. and under autogenous pressures of between 60 and 150 psi for 3 to 48 hours with an aqueous suspension of a copolymer containing an ethylenically unsaturated dicarboxylic acid, its anhydride, or a half-acid derivative of the dicarboxylic acid and a vinyl aryl monomer copolymerized therewith. In conducting this reaction, the ammonia or amines may be used in stoichiometric amounts based on the dicarboxylic acid moiety in the copolymer. However, to ensure complete conversion of the dicarboxylic acid moiety to the desired imide or N-substituted imide, an excess of the stoichiometric amount is used. Use of less than stoichiometric amounts of the amine makes it possible to prepare terpolymers containing both the uncyclized dicarboxylic acid function and the imide function. Further heating in the open will completely cyclize the acid function to form the terpolymer containing the anhydride and the imide groups. Such terpolymers, preparation and illustrative examples of which are given in U.S. Pat. No. 3,840,499, are suitable for use in this invention and are included herein as component (b) copolymers.

Vinyl aromatic compounds of component (b) can be compounds of the formula:

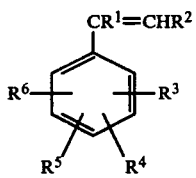

where $R^1$ and $R^2$ are independently selected from the group consisting of alkyl groups of from 1 to 6 carbon atoms and hydrogen; $R^3$, $R^4$, $R^5$ and $R^6$ are independently selected from the group consisting of chloro, bromo, hydrogen and alkyl of from 1 6 carbon atoms; and two of $R^3$, $R^4$, $R^5$ and $R^6$ may be concatenated together with hydrocarbyl groups to form a naphthyl group in which the vinylic substituent is preferably in the 1-position. All such compounds are free of any substituent that has a tertiary carbon atom. Preferred vinyl aromatics are the styrenes, i.e., compounds in which $R^2$ is hydrogen and $R^3$, $R^4$, $R^5$ and $R^6$ are independently hydrogen, alkyl of 1 to 6 carbon atoms, chloro or bromo. Of these compounds, styrenes in which $R^1$ is hydrogen or methyl and $R^3$, $R^4$, $R^5$ and $R^6$ are independently hydrogen, methyl or ethyl are most preferred. Styrene itself is the most preferred vinyl aromatic compound.

The imide derivatives of an ethylenically unsaturated dicarboxylic acid present in component (b) may also be termed an $\alpha,\beta$-unsaturated cyclic imide. Such imides have the formula:

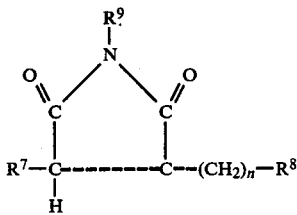

wherein the dash lines represent a single or a double carbon-to-carbon bond, $R^7$ is selected from the group consisting of hydrogen, alkyl, or aryl radicals containing up to 8 carbon atoms, $R^8$ is selected from the group consisting of hydrogen, vinyl, alkyl, alkenyl, alkycarboxylic or alkenylcarboxylic of from 1 to 12 carbon atoms, $R^9$ is selected from the group consisting of hydrogen, lower alkyl, cycloalkyl or aryl and n is an integer of from 0 to about 10. Examples include maleimide, methyl maleimide, dimethyl maleimide, N-methyl maleimide, phenyl maleimide and mixtures thereof. Maleimide is the preferred cyclic imide of component (b).

Exemplary component (b) copolymers include thermoplastic copolymers composed of the following: styrene-maleimide, styrene-maleimide-maleic anhydride, styrene-N-methylmaleimide, styrene-N-methylmaleimide-maleic anhydride, styrene-N-butylmaleimide, styrene-N-butylmaleimide-maleic anhydride, 4-methylstyrene-maleimide, styrene-α-methylstyrene-maleimide, styrene-2,4-dichlorostyrene-maleimide-maleic anhydride, and the like.

In preparing the rubber-modified copolymers of component (b) such rubbers as polybutadiene, isobutylene-isoprene copolymer, styrene-butadiene copolymer, butadiene-acrylonitrile copolymer, ethylene-propylene copolymer, polyisoprene, ethylene-propylene-diene monomer terpolymers (EPDM) and the like can be employed. In this connection see U.S. Pat. No. 3,998,907 the disclosure of which is incorporated herein.

As set forth in U.S. Pat. No. 3,998,907 such rubber-modified copolymers can be prepared directly by reacting aqueous ammonia or amines at 125°–200° C. and under autogenous pressures of between 60 and 150 psi for 0.5 to 48 hours with a rubber-modified copolymer containing an ethylenically unsaturated dicarboxylic acid, its anhydride, or a half-acid derivative of the dicarboxylic acid. The starting copolymers for the process comprise known copolymers of ethylenically unsaturated dicarboxylic acids, or their derivatives with one or more copolymerizable vinyl aryl monomers, and are prepared by polymerizing a mixture of the monomers in the presence of the rubber. Examples IX, X, XI and XII of U.S. Pat. No. 3,998,907 illustrate the process.

The component (b) copolymers preferably contain about 95 to about 75 (most preferably about 90 to about 80) weight percent of the polymerized vinyl aromatic comonomer and about 5 to about 25 (most preferably about 10 to about 20) weight percent of the polymerized imide comonomer, and up to about 35 parts by weight of the rubber per 100 parts by weight of the resin phase of the copolymer. Most preferably the rubber content of the rubber-modified copolymers will fall in the range of about 5 to about 25 parts by weight per 100 parts by weight of the resin phase of the copolymer.

As noted above a portion, preferably a minor proportion, of the $\alpha,\beta$-unsaturated cyclic imide may be "replaced" in the component (b) copolymers by the corresponding $\alpha,\beta$-unsaturated cyclic anhydride—e.g., when forming the imide copolymer from the dicarboxylic acid or anhydride copolymer by the preferred process route, less than a stoichiometric amount of the ammonia or amine may be used whereby a portion of the initial dicarboxylic acid or anhydride remains in the copolymer, the dicarboxylic acid if present readily being converted into its anhydride form. In other words, the component (b) copolymers include thermoplastic copolymers of a vinyl aromatic compound and both an imide derivative of an ethylenically unsaturated dicarboxylic acid and an anhydride derivative of an ethylenically unsaturated dicarboxylic acid. The imide and anhydride portion of the copolymers are, of course, cyclic in structure.

Likewise, the rubber-modified component (b) copolymers include rubber-modified thermoplastic copolymers of a vinyl aromatic compound and both an imide derivative of an ethylenically unsaturated dicarboxylic acid and an anhydride derivative of an ethylenically unsaturated dicarboxylic acid. The vinyl aromatic, cyclic imide and cyclic anhydride portions of the copolymers are grafted onto the substrate rubber.

Preferred component (b) copolymers are the styrene-maleimide and styrene-maleimide-maleic anhydride copolymers, both unmodified and in the form of rubber-modified copolymers.

A preferred unmodified vinyl aromatic α, β-unsaturated cyclic imide copolymer used in the compositions of this invention is Dylark ® DKB 176, supplied by ARCO/Polymers. This is described as a styrene-maleimide copolymer containing about 17 percent maleimide. A preferred rubber-modified copolymer is Dylark ® DKB 162 supplied by ARCO/Polymers. This has been described as a styrene-maleimide copolymer containing about 15 percent rubber and about 11 percent maleimide, with the balance being styrene. Chemical analysis of a sample of DKB 162 indicated that it contained about 10.1 percent maleimide and about 1.6 percent maleic anhydride.

Accordingly, this invention provides, inter alia, a thermoplastic composition which comprises in intimate admixture:
  (a) a vinyl chloride polymer; and
  (b) (i) a thermoplastic binary copolymer of a vinyl aromatic compound and an imide derivative of an ethylenically unsaturated dicarboxylic acid, or (ii) a thermoplastic ternary copolymer of a vinyl aromatic compound, an imide derivative of an ethylenically unsaturated dicarboxylic acid and an anhydride derivative of an ethylenically unsaturated dicarboxylic acid;
said admixture containing 90 to 40 weight percent of (a) and 10 to 60 weight percent of (b).

Likewise this invention provides, inter alia, a thermoplastic composition which comprises in intimate admixture:
  (a) a vinyl chloride polymer; and
  (b) (i) a rubber-modified thermoplastic binary copolymer of a vinyl aromatic compound and an imide derivative of an ethylenically unsaturated dicarboxylic acid grafted onto a substrate rubber, or (ii) a thermoplastic ternary copolymer of a vinyl aromatic compound, an imide derivative of an ethylenically unsaturated dicarboxylic acid and an anhydride derivative of an ethylenically unsaturated dicarboxylic acid grafted onto a substrate rubber;
said admixture containing 90 to 25 weight percent of (a) and 10 to 75 weight percent of (b).

The various compositions of this invention can include other ingredients, such as impact modifiers, thermal stabilizers, processing aids, fillers, lubricants, pigments, flame retardants, reinforcing fibers, smoke retardants, antioxidants, and the like, for their conventionally employed purposes.

Preferred compositions of this invention include those containing impact modifiers. Among the suitable materials for this use are styrene-methyl methacrylate grafted on butadiene (MBS), acrylonitrile-styrene grafted on butadiene (ABS), styrene-acrylonitrile grafted on EPDM, styrene-methylmethacrylate-acrylonitrile grafted on butadiene (MABS), chlorinated polyethylene, methyl methacrylate or methacrylate-styrene grafted on a polyacrylate such as polybutylacrylate, vinyl chloride grafted on ethylene-ethyl acrylate copolymer, vinyl chloride grafted on butyl rubber, vinyl chloride grafted on EPDM, ehtylene/vinyl acetate copolymers, ethylene/acrylic acid copolymers (having some of the acid functions neutralized), ethylene/methacrylic acid copolymers (having some of the methacrylic acid functions neutralized), ethylene/alkyl acrylate/methacrylic acid terpolymer (also having some of the methacrylic acid functions neutralized), oxidized polyethylene, styrene-butadiene-styrene (S-B-S) block copolymers, styrene/butadiene multiblock copolymers, styrene/butadiene radial block copolymers, hydrogenated S-B-S block copolymers, styrene/butadiene rubber, acrylic rubbers, EPDM, ethylene/methyl acrylate copolymers, ethylene/ethyl acrylate copolymers, and the like. These materials are available in a range of suitable molecular weights for use as impact modifiers. Amounts of impact modifiers generally fall within the range of from about 5 to about 20 phr.

For protection against thermal degradation, polyvinyl chloride stabilizers can be added to the compositions of this invention. Examples of suitable stabilizers are metal salts and soaps such as the laurates or stearates of barium, cadmium or zinc; tin stabilizers such as di-n-alkyltin mercaptides, di-n-alkyltin dilaurates, dibutyltin mercaptide, dibutyltin lauryl mercaptide, di-octyltin-S,S'-bis-(isooctylmercaptoacetate), dibutyltin bis-isooctylthioglycolate or other so-called dibutyltin thioglycolates, di-(n-octyl)tin maleate polymer, dibutyltin mercaptopropionate; and phosphites and polyphosphites, preferably the aryl derivatives thereof. The amount of the stabilizer will of course depend to some extent on the make-up of the stabilizer system used, but usually will range below about 10 phr.

A preferred embodiment of this invention involves use of lead stabilizers in the blends. Such materials have been found particularly effective. Thus use may be made of such materials as the laurates and stearates of lead (e.g., monobasic and dibasic lead stearates), basic lead carbonate, basic lead sulfates, dibasic lead phosphite, dibasic lead phthalate, basic lead silicate, white lead, lead chlorosilicate, lead oxide, lead oxide-lead silicate mixtures and the like. Amounts will normally fall below about 10 phr, from 4 to 10 being a preferred range.

Processing aids of various types are entirely suitable for use in the blends of this invention. For example, use may be made of such polyvinyl chloride processing aids as those made from copolymers of methyl methacrylate and styrene, terpolymers of methyl methacrylate, lower alkyl acrylate and acrylonitrile, or terpolymers of methyl methacrylate, lower alkyl acrylate and diaklyl itaconate, and the like. The preferred processing aids are methyl methacrylate-lower alkyl acrylate copolymers having a small portion (e.g., 3 to 15 percent) of the lower alkyl acrylate comonomer (e.g., butyl acrylate) and having an inherent viscosity as measured at a concentration of 0.25 grams per 100 milliliters of chloroform at 25° C. of at least 0.1 and preferably 0.5 or higher. A variety of suitable products, including the preferred types, are available from various commercial sources. Amounts used will generally range from about 0.5 to about 10 phr.

The compositions of this invention can also contain fillers. Examples are calcium carbonate, silicates such as talc and acicular calcium silicate, titanium dioxide, potassium titanate, and glass flakes. Amounts of such fillers of up to about 50 phr may be used.

Typical lubricants which may be used in the blends of this invention include metal soaps, stearic acid, gylceryl monostearate, ethyl diaminostearate, ester lubricants, paraffin and low molecular weight waxes, mineral oils, and the like. Conventional pigments used in polyvinyl chloride may likewise be used in the blends of this invention in conventional amounts. Ordinarily the concentration of the lubricant and pigment will not exceed about 10 phr.

Flame retarding addditives which may be used in the compositions of this invention comprise a large number of chemical compounds which are well known to those skilled in the art. In general, they contain chemcial elements which are used because of their flame-retarding capacity, for example bromine, chlorine, antimony, phosphorus and nitrogen. Preferably, the flame-retarding additives are inorganic compounds which are normally effective in combination with halogenated organic compounds. These are materials such as antimony compounds (e.g., antimony trioxide), zinc compounds (e.g., zinc borate), antimony-zinc complex compounds (e.g., Oncor 75RA, a product of NL Industies, Inc.), iron compounds (e.g., ferric oxide), and other metal-based inorganic compounds which perform well with antimony oxide (e.g., Ongard 2, a product of NL Industries, Inc.). When using a flame retardant, the amount should be sufficient to yield a blend having a UL 94 rating of V-1 or better using test bars 0.060 inch thick.

If desired, appropriate amounts of reinforcing fibers such as carbon filaments, asbestos, titanate whiskers, and glass fiber may be employed. The amount of such materials usually will not exceed about 20 phr. Ordinarily such reinforcing fiber would be used in lieu of a filler although suitable proportions of both materials may prove satisfactory.

Smoke suppressing additives may also be used. Examples include alumina trihydrate, cuprous cyanide, and combinations of nickel carbonate and zinc oxide. Amounts of up to 15 phr are appropriate.

Phosphites and phenolic compounds typify the antioxidants which may be used, if desired.

The compositions of the invention may be prepared by blending the components in a mixer (e.g., a Henschel mixer) and compounding the mixture on an extruder (e.g., a Buss Ko-Kneader, a Farrel Continuous Mixer or a Werner-Pfleiderer compounding extruder). Thereafter, the extrudate is chopped into pellets and is suitable for molding, for example on an injection molding machine or by means of compression molding, extrusion molding or the like.

The present invention is further illustrated in the following examples, which are not to be construed as limiting.

EXAMPLE I

A series of blends of this invention was prepared from a commercial grade of polyvinyl chloride having a relative viscosity (measured as described above) of 1.60 and a rubber-modified styrene-maleimide copolymer obtained from ARCO/Polymers, Inc. under designation DKB 162. The copolymer was described as a styrene-maleimide copolymer containing about 15% rubber and about 11% maleimide. In other words, it would contain on a weight basis about 87% styrene and about 13% maleimide (as the resin phase) and about 17.7 phr of rubber. Chemical analysis of a sample of DKB 162 indicated that it contained about 10.1 percent maleimide and about 1.6 percent maleic anhydride. The blends were made by mechanically mixing the PVC and the copolymer in various proportions together with conventional additives of the type used in making proprietary PVC compositions. The proportions of the materials in the blends were as follows:

| Parts by Weight | Components |
|---|---|
| 100 | PVC + DKB 162 |
| 7.5 | Lead Stabilizer (lead oxide/silicate mixture) |
| 4.5 | Lubricants (calcium stearate, ester lubricant and mineral oil) |
| 12 | Impact Modifier (MBS-type) |
| 2 | Processing Aid (methyl methacrylate-butyl acrylate copolymer) |
| 3 | $CaCO_3$ Filler |

The PVC and DKB 162 were proportioned in parts by weight in this manner:

| PVC | Styrene-Maleimide Copolymer (SMI) |
|---|---|
| 100 (Control) | — |
| 90 | 10 |
| 80 | 20 |
| 70 | 30 |
| 60 | 40 |
| 50 | 50 |

Each blend was individually processed in a Brabender and the resultant blends compression molded into ⅛ inch plaques. The FIGURE of the Drawing shows the heat deflection temperatures of the samples as determined at 264 psi using the procedure of ASTM D 648.

EXAMPLE II

Plaques ¼ inch in thickness were compression molded from a blend of 50 parts by weight of the PVC and 50 parts by weight of the SMI copolymer of Example I. The same formulation of ingredients and processing were employed as in Example I. The properties of the blend as determined from the plaques were as follows:

| | |
|---|---|
| Specific Gravity | 1.239 |
| Izod Impact, ft-lb/in. | 1.0 |
| Annealed HDT, °C., 66 psi | 108.6 |
| Unannealed HDT, °C., 66 psi | 105.9 |

Three PVC/SMI blends were prepared and processed as in Example I having respectively 30 phr, 40 phr and 50 phr of the same rubber-modified styrene-maleimide copolymer in the same formulation. Physical properties of the blends using compression molded test pieces were as follows:

| Properties | Blends of the Invention (PVC/SMI) | | |
|---|---|---|---|
| | 70/30 | 60/40 | 50/50 |
| Specific Gravity | 1.322 | 1.301 | 1.281 |
| Izod Impact (¼ inch) ft-lb/in. | 1.4 | 1.0 | 1.5 |
| Unannealed HDT, °C. | | | |
| at 264 psi | 70.0 | 73.1 | 81.2 |
| at 66 psi | 79.8 | 87.0 | 110.5 |
| Annealed HDT, °C. | | | |
| at 264 psi | 77.0 | 77.0 | 86.0 |
| at 66 psi | 92.0 | 85.0 | 114.5 |
| UL 94 Flame resistance | V-O | V-O | fail |

EXAMPLE IV

A blend of 50 phr PVC and 50 phr SMI in the same formulation as Example I was subjected to a standard test to determine its dynamic thermal stability. In this test a Brabender Plasticorder fitted with a No. 6 mixing head heated to 190° C. is charged with 60 grams of the formulation to be tested, with the rotor speed held constant at 150 rpm after charging. The test is continued at 190° C., with 150 rpm rotor speed, until the torque increases by 200 meter-grams above the equilibrium torque (which is the constant torque value attained following the initial substantial torque increase observed during fusion of the formulation). The dynamic thermal stability is expressed as the time from charging of the sample until the 200 meter-grams torque increase has occurred. Thus the longer the time, the higher the dynamic thermal stability. The results of the test on this blend were as follows:

| | |
|---|---|
| Dynamic Thermal Stability, minutes | 11.0 |
| Equilibrium Torque, meter-grams | 1700 |

EXAMPLE V

Using the PVC and styrene-maleimide copolymer of Example I, two tin-stabilized blends of the invention were prepared using the following formulation:

| Parts by Weight | Components |
|---|---|
| 50 | Polyvinyl Chloride |
| 50 | DKB 162 |
| 2 | Tin Stabilizer (Dibutyltin thioglycolate type) |
| 4.5 | Lubricants (See Example I) |
| 2 | Processing Aid (See Example I) |
| 3 | CaCO$_3$ Filler |

In one case (Blend A) no impact modifer was included. In a second case (Blend B) 12 parts by weight of an MBS-type impact modifier was added to the above formulation. The blends were subjected to the standard dynamic thermal stability test described in Example IV. The results were as follows:

| | Blend A | Blend B |
|---|---|---|
| Dynamic Thermal Stability, minutes | 22.0 | 12.0 |
| Equilibrium Torque, meter-grams | 900 | 1000 |

A comparison of these results with the results of Example IV indicates that the tin-stabilized blends were superior to the lead-stabilized blend in their melt flow (equilibrium torque) characteristics.

EXAMPLE VI

Employing the formulation of Example I, a 50 phr PVC/50 phr SMI blend was prepared and processed in a Banbury at 340° F. The blend was injection molded on New Britain injection molding machine at the following conditions:

| | |
|---|---|
| Zone 1 | 310° F. |
| Zone 2 | 320° F. |
| Zone 3 | 330° F. |
| Nozzle | 70% |
| Injection Speed | 5 turns off maximum |
| Shot Size | 1.25 |
| Hold Time | 5 seconds |
| Cooling Time | 45 seconds |
| Mold Temperature, °F. | 100/100 |
| Injection Pressure | Maximum |
| Hold Pressure | 1300 psi |
| Back Pressure | 400 psi |

Physical properties of the injection molded test pieces are shown in the ensuing tabulation. For comparison the data on the corresponding PVC formulation (no SMI) are also tabulated.

| | Control | PVC/SMI |
|---|---|---|
| Specific Gravity | 1.392 | 1.232 |
| Tensile Yield, psi | 5760 | 4970 |
| Tensile Elastic Mod., 10$^3$ psi | 356 | 338 |
| Elongation, % | 10 | 9 |
| Flexural Strength, psi | 9860 | 9030 |
| Flexural Elastic Mod., 10$^3$ psi | 324 | 312 |
| Izod Impact, ft-lb/in. | | |
| ⅛ inch bar | 2.9 | 1.1 |
| ¼ inch bar | 11.8 | 1.2 |
| Heat Deflection Temperature, °C. | | |
| at 264 psi | 68 | 77 |
| at 66 psi | 75 | 99 |
| Annealed 90° C. Heat Deflection Temperature, °C. | | |
| at 264 psi | 75 | 92 |
| at 66 psi | 80 | 118 |
| Rockwell Hardness, R Scale | 101.8 | 99.1 |

EXAMPLE VII

Five blends were prepared using the PVC of Example I. One blend (control) had 100 phr of the PVC in the formulation of Example I (no DKB 162). Blends A through D had 50 phr PVC and 50 phr DKB 162 in the same formulation but differing only in this respect: Blend A contained no impact modifier, Blend B contained 13 phr of an MBS-type impact modifier, Blend C contained 12 phr of another MBS-type impact modifier, and Blend D contained 13 phr of an ABS-type impact modifier. The five blends were subjected to the dynamic thermal stability test described in Example IV with the following results:

| Blend | DTS, minutes | Equilibrium Torque, meter-grams |
|---|---|---|
| Control | 44 | 780 |
| A | 9.5 | 1410 |
| B | 9.5 | 1700 |
| C | 9.5 | 1700 |
| D | 9 | 1600 |

These blends were injection molded under the following conditions with a New Britain machine:

| | |
|---|---|
| Zone 1 | 310° F. |
| Zone 2 | 320° F. |
| Zone 3 | 330° F. |
| Nozzle | 73% |
| Injection Speed | 6.5 turns off maximum |
| Shot Size | 1.25 |
| Hold Time | 5 seconds |
| Cooling Time | 45 seconds |
| Mold Temperature | 125/125° F. |

-continued

| | |
|---|---|
| Injection Pressure | Maximum |
| Hold Pressure | 1300 psi |
| Back Pressure | 400 psi |

| | Control | Blend A | Blend B | Blend C | Blend D |
|---|---|---|---|---|---|
| Amps | 5.6 | 6.1 | 6.4 | 6.4 | 6.4 |
| Screw Recovery Time, sec. | 16 | 12 | 10 | 11 | 10 |
| Spiral Flow, in. | 17 | 16.25 | 15.5 | 15.5 | 15.5 |

The physical properties of these alloys are presented in Table I.

TABLE I

Physical Properties of PVC/SMI Alloys

| | | PVC/DKB 162 | | | |
|---|---|---|---|---|---|
| Physical Properties | Control | Blend A | Blend B | Blend C | Blend D |
| Specific Gravity | 1.390 | 1.271 | 1.247 | 1.242 | 1.236 |
| Tensile Yield, psi | 5730 | 5270 | 4670 | 4970 | 5080 |
| Tensile Elastic Modulus, $10^3$ psi | 334 | 390 | 311 | 332 | 338 |
| Elongation, % | 15 | 10 | 7 | 13 | 11 |
| Flexural Strength, psi | 9810 | 9330 | 8410 | 9170 | 9320 |
| Flexural Elastic Modulus, $10^3$ psi | 320 | 373 | 316 | 301 | 339 |
| Izod Impact, ft-lb/in. | 8.1 | 0.5 | 0.9 | 1.1 | 0.5 |
| Izod Impact, ⅛ in. Bar | 14.7 | 0.5 | 0.9 | 1.2 | 1.0 |
| Izod Impact, ⅛ in. Bar (Annealed) | 1.8 | 0.5 | 0.7 | 0.6 | 0.5 |
| Izod Impact, ⅛ in. Bar (−40° C.) | 0.8 | 0.5 | 0.7 | 0.6 | 0.7 |
| Heat Deflection Temperature, °C. | | | | | |
| at 264 psi | 68 | 78 | 76 | 78 | 79 |
| at 66 psi | 73 | 106 | 106 | 103 | 93 |
| at 264 psi (Annealed) | 79 | 95 | 88 | 88 | 91 |
| at 66 psi (Annealed) | 79 | 120 | 119 | 118 | 119 |
| Rockwell Hardness, R Scale | 101 | 106 | 96 | 99 | 100 |
| Melt Viscosity at 190° C., 2940 sec.$^{-1}$ | 1800 | 3020 | 3310 | 3500 | 3130 |

EXAMPLE VIII

Another series of 50 phr PVC/50 phr SMI blends was prepared, processed and evaluated as in Example VII with the sole variant being the type and quantity of impact modifier used, as follows:

| Blend | Impact Modifier |
|---|---|
| A | MBS-type 12 phr |
| B | MBS-type, 10 phr + S—B—S copolymer, 5 phr |
| C | MBS-type, 10 phr + chlorinated polyethylene, 5 phr |
| D | Ethylene-vinyl acetate copolymer, 11 phr |
| E | Acrylic type, 12 phr |

Table II shows the results obtained.

TABLE II

Properties of PVC/SMI Alloys

| Property | Blend A | Blend B | Blend C | Blend D | Blend E |
|---|---|---|---|---|---|
| Specific Gravity | 1.226 | 1.219 | 1.236 | 1.220 | 1.246 |
| Tensile Yield, psi | 5120 | 4580 | 4860 | 3310 | 4750 |
| Tensile Elastic Modulus, $10^3$ psi | 346 | 288 | 295 | 235 | 307 |
| Elongation, % | 5.4 | 6.4 | 6.7 | 6.7 | 6.5 |
| Flexural Strength, psi | 9170 | 8390 | 8630 | 6270 | 8500 |
| Flexural Elastic Modulus, $10^3$ psi | 315 | 311 | 303 | 227 | 309 |
| Izod Impact, ¼ in. bar, ft-lb/in. | 1.1 | 1.0 | 1.1 | 0.7 | 0.6 |
| ⅛ in. bar, ft-lb/in. | 1.2 | 0.9 | 1.2 | 0.6 | 0.6 |
| Heat Deflection Temperature, °C. | | | | | |
| at 264 psi | 75 | 77 | 76 | 74 | 77 |
| at 66 psi | 100 | 109 | 105 | 84 | 103 |
| at 264 psi (Annealed at 90° C.) | 99 | 90 | 97 | 77 | 89 |
| at 66 psi (Annealed at 90° C.) | 121 | 121 | 122 | 108 | 118 |
| Rockwell Hardness, R Scale | 99 | 94 | 95 | 71 | 100 |
| Vicat Softening Pt., °C. | 121 | 121 | 116 | 94 | 116 |
| Brabender Equilibrium Torque, meter-grams | 1700 | 1600 | 1600 | 1100 | 1600 |
| Brabender DTS, minutes | 8.0 | 9.5 | 14.0 | 17.0 | 11.0 |
| Spiral Flow, inches | 15.0 | 16.25 | 16.0 | 17.0 | 16.25 |
| Screw Recovery Time, seconds | 12 | 13 | 12 | 10 | 12 |

EXAMPLE IX

A comparison of tin and lead stabilizers effectiveness was made using two different samples of the styrene-maleimide copolymer, DKB 162. Four blends were produced, two (one tin-stabilized and one lead-stabilized) using a first sample of DKB 162 and the other two (one tin-stabilized and one lead-stabilized) using a second sample of DKB 162 produced at a later date. All four blends had 50 phr of the PVC of Example I and 50 phr of the particular DKB 162. The tin-stabilized blends had the formulation of Example V (including the 12 parts by weight of the MBS-type impact modifier) whereas the lead-stabilized blends had the formulation of Example I. The chief difference noted in the results was the greater heat deflection temperature at 66 psi (°C.) exhibited by the lead-stabilized blends using compression molded ¼ inch test bars:

| Blend | HDT at 66 psi |
| --- | --- |
| Tin stabilized (First DKB 162) | 77 |
| Lead stabilized (First DKB 162) | 102 |
| Tin stabilized (Second DKB 162) | 81 |
| Lead stabilized (Second DKB 162) | 88 |

This invention is susceptible to variation within the spirit and scope of the disclosure and ensuing claims.

We claim:

1. A thermoplastic composition which comprises in intimate admixture:
   (a) a vinyl chloride polymer; and
   (b) (i) a thermoplastic binary copolymer of a vinyl aromatic compound and an imide derivative of an ethylenically unsaturated dicarboxylic acid or (II) a thermoplastic ternary copolymer of a vinyl aromatic compound, an imide derivative of an ethylenically unsaturated dicarboxylic acid and an anyhydride derivative of an ethylenically unsaturated dicarboxylic acid;
   said admixture containing 90 to 40 weight percent of (a) and 10 to 60 weight percent of (b).

2. A composition of claim 1 wherein (b) is (i) a copolymer of a styrene monomer and maleimide or (ii) a copolymer of a styrene monomer, maleimide and maleic anhydride.

3. A composition of claim 1 wherein (b) is a styrene-maleimide copolymer containing about 95 to about 75 weight percent of styrene and about 5 to about 25 weight percent of maleimide, and from zero up to about 25 parts by weight of a rubber per 100 parts by weight of the resin phase of said copolymer.

4. A composition of claim 1 wherein (b) is a styrene-maleimide-maleic anhydride copolymer containing about 95 to about 75 weight percent of styrene and about 5 to about 25 weight percent of maleimide and maleic anhydride, and from zero up to about 25 parts by weight of a rubber per 100 parts by weight of the resin phase of said copolymer.

5. A composition of claim 1 wherein said admixture contains about 60 to 40 weight percent of (a) and about 40 to 60 weight percent of (b).

6. A composition of claim 1 wherein said admixture contains about 50 weight percent of (a) and about 50 weight percent of (b).

7. A composition of claim 1 wherein (a) is polyvinyl chloride.

8. A composition of claim 1 wheren (a) is polyvinyl chloride having a relative viscosity as measured at a concentration of 1 gram per 100 grams of cyclohexanone at 25° C. falling within the range of about 1.50 to about 1.85.

9. A composition of claim 1 wherein (a) is polyvinyl chloride and (b) is (i) a copolymer of a styrene monomer and maleimide or (ii) a copolymer of a styrene monomer, maleimide and maleic anhydride.

10. A composition of claim 1 wherein (a) is polyvinyl chloride having a relative viscosity as measured at a concentration of 1 gram per 100 grams of cyclohexanone at 25° C. falling within the range of about 1.50 to about 1.85 and (b) is a styrene-maleimide copolymer containing about 95 to about 75 weight percent of styrene and about 5 to about 25 weight percent of maleimide, and from zero up to about 25 parts by weight of a rubber per 100 parts by weight of the resin phase of said copolymer.

11. A composition of claim 1 wherein (a) is polyvinyl chloride having a relative viscosity as measured at a concentration of 1 gram per 100 grams of cyclohexanone at 25° C. falling within the range of about 1.50 to about 1.85 and (b) is a styrene-maleimide-maleic anhydride copolymer containing about 95 to about 75 weight percent of styrene and about 5 to about 25 weight percent of maleimide and maleic anhydride, and from zero up to about 25 parts by weight of a rubber per 100 parts by weight of the resin phase of said copolymer.

12. A composition of claim 1 wherein (a) is polyvinyl chloride having a relative viscosity as measured at a concentration of 1 gram per 100 grams of cyclohexanone at 25° C. falling within the range of about 1.50 to about 1.65, and (b) is a styrene-maleimide copolymer containing about 90 to about 80 weight percent of styrene and about 10 to about 20 weight percent of maleimide, and from zero up to about 25 parts by weight of a rubber per 100 parts by weight of the resin phase of said copolymer.

13. A composition of claim 1 wherein (a) is polyvinyl chloride having a relative viscosity as measured at a concentration of 1 gram per 100 grams of cyclohexanone at 25° C. falling within the range of about 1.50 to about 1.65, and (b) is a styrene-maleimide-maleic anhydride copolymer containing about 90 to about 80 weight percent of styrene and about 10 to about 20 weight percent of maleimide and maleic anhydride, and from zero up to about 25 parts by weight of a rubber per 100 parts by weight of the resin phase of said copolymer.

14. A composition of claim 1 wherein said admixture additionally contains at least a thermal stabilizer and an impact modifier for vinyl chloride polymers.

15. A composition of claim 14 wherein the stabilizer is a lead stabilizer.

16. A composition of claim 14 wherein the impact modifier includes an impact modifier of the MBS-type.

17. A thermoplastic composition which comprises in intimate admixture:
   (a) a vinyl chloride polymer; and
   (b) (i) a rubber-modified thermoplastic binary copolymer of a vinyl aromatic compound and an imide derivative of an ethylenically unsaturated dicarboxylic acid grafted onto a substrate rubber or (ii) a thermoplastic ternary copolymer of a vinyl aromatic compound, an imide derivative of an ethylenically unsaturated dicarboxylic acid and an anhydride derivative of an ethylenically unsaturated dicarboxylic acid grafted onto a substrate rubber;
   said admixture containing 90 to 25 weight percent of (a) and 10 to 75 weight percent of (b).

18. A composition of claim 17 wherein (b) is (i) a rubber-modified copolymer of a styrene monomer and maleimide or (ii) a rubber-modified copolymer of a styrene monomer, maleimide and maleic anhydride.

19. A composition of claim 17 wherein (b) is a rubber-modified styrene-maleimide copolymer containing about 95 to about 75 weight percent of styrene and about 5 to about 25 weight percent of maleimide, and up to about 35 parts by weight of a rubber per 100 parts by weight of the resin phase of said copolymer.

20. A composition of claim 19 wherein the rubber-modified copolymer of (b) contains about 5 to about 25 parts by weight of a rubber per 100 parts by weight of the resin phase of said copolymer.

21. A composition of claim 17 wherein (b) is a rubber-modified styrene-maleimide-maleic anhydride copolymer containing about 95 to about 75 weight percent of styrene and about 5 to about 25 weight percent of maleimide and maleic anhydride, and up to about 35 parts by weight of a rubber per 100 parts by weight of the resin phase of said copolymer.

22. A composition of claim 21 wherein the rubber-modified copolymer of (b) contains about 5 to about 25 parts by weight of a rubber per 100 parts by weight of the resin phase of said copolymer.

23. A composition of claim 17 wherein said admixture contains about 60 to about 35 weight percent of (a) and about 40 to about 65 weight percent of (b).

24. A composition of claim 17 wherein said admixture contains about 50 weight percent of (a) and about 50 weight percent of (b).

25. A composition of claim 17 wherein (a) is a polyvinyl chloride.

26. A composition of claim 17 wherein (a) is polyvinyl chloride having a relative viscosity as measured at a concentration of 1 gram per 100 grams of cyclohexanone at 25° C. falling within the range of about 1.50 to about 1.65.

27. A composition of claim 17 wherein (a) is polyvinyl chloride and (b) is (i) a rubber-modified copolymer of a styrene monomer and maleimide or (ii) a rubber-modified copolymer of a styrene monomer, maleimide and maleic anhydride.

28. A composition of claim 17 wherein (a) is polyvinyl chloride having a relative viscosity as measured at a concentration of 1 gram per 100 grams of cyclohexanone at 25° C. falling within the range of about 1.50 to about 1.65, and (b) is (i) a rubber-modified styrene-maleimide copolymer containing about 5 to about 15 parts by weight of a rubber per 100 parts by weight of the resin phase of the copolymer of (ii) a rubber-modified styrene-maleimide-maleic anhydride copolymer containing about 5 to about 15 parts by weight of a rubber per 100 parts by weight of the resin phase of the copolymer.

29. A composition of claim 17 wherein said admixture additionally contains a least a thermal stabilizer and an impact modifier for vinyl chloride polymers.

30. A composition of claim 29 wherein the stabilizer is a lead stabilizer.

31. A composition of claim 29 wherein the impact modifier includes an impact modifier of the MBS-type.

* * * * *

UNITED STATES PATENT AND TRADEMARK OFFICE
CERTIFICATE OF CORRECTION

PATENT NO. : 4,458,046
DATED : JULY 3, 1984
INVENTOR(S) : EDWIN D. HORNBAKER and JESSE D. JONES It is certified that error appears in the above-identified patent and that said Letters Patent is hereby corrected as shown below:

Column 3, line 32, reads "from 1 6 carbon atoms" and should read -- from 1 to 6 carbon atoms --.

Column 3, lines 64-65, read "alkycarboxylic" and should read -- alkylcarboxylic --.

Column 6, lines 2-3, read "ehtylene/vinyl acetate" and should read -- ethylene/vinyl acetate --.

Column 8, line 48, is blank and should read -- EXAMPLE III --.

Column 13, line 20, reads "(II)" and should read -- (ii) --.

Column 16, line 21, reads "a least a thermal" and should read -- at least a thermal --.

Signed and Sealed this

Twenty-third Day of October 1984

[SEAL]

Attest:

GERALD J. MOSSINGHOFF

Attesting Officer

Commissioner of Patents and Trademarks